2,801,200
Patented July 30, 1957

2,801,200

METHOD OF PROTECTING PLANTS FROM FUNGI BY EMPLOYING N-HALOACYL UREA

Johannes Thomas Hackmann, Amsterdam, Netherlands, assignor to Shell Development Company, Emeryville, Calif., a corporation of Delaware No Drawing. Application December 16, 1952, Serial No. 326,347

Claims priority, application Germany January 8, 1952

6 Claims. (Cl. 167—22)

This invention relates to a composition for protecting plants from destruction by parasitic pathogens, particularly fungi. Also, it pertains to a method of protecting plants from destruction by parasitic pathogens, e. g., fungi, by the use of certain materials having an internal chemotherapeutic action.

It is known that certain materials, for example, ethylene bis-dithiocarbamate, 2-norcamphane methanol, and 4-chloro-3,5-dimethylphenoxy-ethanol, are effective for protecting plants against diseases caused by pathogens, such as fungi, through an internal chemotherapeutic action. These materials penetrate into the plants through which they spread, thereby rendering the plants immune or at least less susceptible to the attack of parasitic pathogens. Usually, the immunity lasts a few weeks, for instance, three weeks, after the substances have been absorbed by the plants. In many cases, the same agents also have a curative effect if the plants are already affected. These materials are usually called systematic fungicides, in analogy to systemic insecticides which also penetrate into the plants rendering them toxic to insects and related animal parasites, such as mites.

In view of the fact that it is not necessary for these materials to be toxic to fungi when contacted directly therewith, as in the well known spore germination test, in order to be effective as systemic fungicides, it is believed that these systemics are converted to some other products within the living plants, the immunity and/or recovery being caused only by certain conversion products. This is merely a supposition at present, but what is certain is that a favorable effect is obtained by the penetration of the material into the plants themselves.

In many instances such parts of the plants as develop after application of the systemic fungicide, such as new shoots, blades, flowers, fruits, etc., become immune for a certain period of time, which is not the case with the use of externally acting fungicides.

In accordance with the present invention, it has been found that N-haloacyl ureas in which the acyl radical is the residue of an organic carboxylic acid, are particularly effective for use in protecting plants from destruction by parasitic pathogens. Hereinafter, the term "acyl radical" is used to designate the residue of an organic carboxylic acid, as shown in "Organic Chemistry," Hill and Kelley, The Blakiston Company (Philadelphia), 1943, page 257.

Preferred compounds are those which satisfy the following general structural formula:

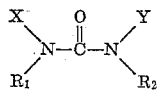

where X is a haloacyl radical, Y is a hydrogen atom, an acyl radical, an alkyl radical, or a monocyclic aryl radical, and $R_1$ and $R_2$ are hydrogen, alkyl radicals, or monocyclic aryl radicals.

The radicals X, Y, $R_1$ and $R_2$ can also contain substituent groups, such as $NO_2$, $SO_3H$, OH, $NH_2$ or halogen atoms. Representative classes of compounds which satisfy the above formula are the N-haloacyl ureas; the N-haloacyl, N'-haloacyl ureas; the N-haloacyl, N'-alkyl ureas; the N-haloacyl, N'-phenyl ureas; the N-haloacyl, N'-acyl ureas; the N-haloacyl, N'-haloalkyl ureas; and the like.

It is preferred that the haloacyl radical, X, be the residue of a halogen-substituted alkanoic acid, particularly an alkanoic acid having not more than 5 carbon atoms, for example, acetic, propionic, butyric, and isobutyric acid, and the pentanoic acids. It is also preferred that the haloacyl radical be an unsubstituted haloacyl radical, that is, contain only halogen, carbon and hydrogen atoms and the oxygen atom of the acyl group, and that the terminal carbon atom of the acyl radical be substituted by from 1 to 3 halogen atoms, particularly chlorine atoms.

Where Y represents an acyl radical, it is preferred that the acyl radical be the residue of an alkanoic acid, particularly an acid having not more than 5 carbon atoms, as described above. Preferred acyl radicals are those which are unsubstituted, that is, contain only C, H, and O atoms, and those which contain substituent halogen atoms, preferably 1 to 3 chlorine atoms attached to the terminal carbon atom. Y can be identical with X. Where Y represents a monocyclic aryl radical, the phenyl group containing, if desired, water solubility-enhancing substituents such as —$SO_3H$, is particularly suitable. Where Y represents an alkyl radical, alkyl radicals containing not more than about 4 carbon atoms are preferred. Either unsubstituted alkyl radicals or alkyl radicals containing substituent halogen atoms, preferably 1 to 3 chlorine atoms attached to the terminal carbon atom, are particularly suitable.

It is preferred that $R_1$ and $R_2$ be hydrogen. Particularly good results are obtained when not only $R_1$ and $R_2$ but also Y are hydrogen atoms, as in for example N-chloroacetyl urea and N-trichloroacetyl urea.

In order for a systemic toxicant to be commercially feasible, it must be rapidly taken up by the plant. Therefore, water-soluble compounds are preferred. In the present specification, solubility in water denotes a solubility of at least about 0.01% by weight at ambient temperatures. Solubility in water is known, generally, to decrease as the number of carbon atoms in the molecule increases. Therefore, with respect to water solubility, N-haloacyl ureas having not more than 9 carbon atoms per molecule are preferred for use in the present invention. However, if water solubility enhancing groups, such as the —$SO_3H$ group, are present, the number of carbon atoms per molecule can be increased. Water-insoluble N-haloacyl ureas can also be employed if a water solubilizing agent is present.

Specific compounds which are suitable for use in the present invention include: N-chloroacetyl urea; N-bromoacetyl urea; N-trichloroacetyl urea; N-tribromoacetyl urea; N-chloroacetyl, N'-phenyl urea; NN'-di(chloroacetyl) urea; NN'-di(bromoacetyl) urea; N-trichloroacetyl, N'-acetyl urea; N-chloroacetyl, N'-acetyl urea; N-bromoacetyl, N'-acetyl urea; N-trichloroacetyl, N'-methyl urea; N-chloroacetyl, N'-isopropyl urea; N-chloroacetyl, N'-chloromethyl urea; N-beta-chloropropionyl urea; N-beta-bromopropionyl urea; N-beta-trichloropropionyl urea; N-beta-tribromopropionyl urea; N-beta-chloropropionyl, N'-propionyl urea; N-beta-bromopropionyl, N'-phenyl urea; N-beta-propionyl, N'-propyl urea; N-beta-propionyl, N'-ethyl urea; N-omega-chlorobutyryl urea; N-omega-bromobutyryl urea; N-omega-trichlorobutyryl urea; N-omega-tribromobutyryl urea; N-alpha-methyl, beta-chloropropionyl urea; N-alpha-methyl,beta-trichloropropionyl urea; N-alpha-methyl, beta-bromopropionyl urea; N-alpha-methyl, beta-trichloropropionyl urea; N-alpha-methyl-beta-bromopropionyl urea; N-alpha-methyl,beta-tribromopropionyl urea; N-alpha-chloromethylpropionyl urea; N-alpha-bromomethylpropionyl urea; N-alpha-trichloromethylpropionyl urea; N-alpha-tribromomethylpropionyl urea; N-alpha-chloromethylpropionyl, N'-phenyl urea; N-alpha-chloromethylpropionyl, N'-propyl urea; N-di(alpha-chloromethylpropionyl) urea; N-alpha-chloromethylpropionyl, N'-chloromethyl urea; N-alpha-chloromethylpropionyl, N'-ethyl urea; N-alpha-chloromethylpropionyl,N'-isobutyryl urea; N-omega-chlorovaleroyl urea; N-omega-bromovaleroyl urea; N-omega-trichlorovaleroyl urea; N-omega-tribromovaleroyl urea; NN'-di(omega-chlorovaleroyl) urea; NN'-di(omega-bromovaleroyl) urea; N-omega-chlorovaleroyl,N'-phenyl urea; N-omega-chlorovaleroyl, N'-chloromethyl urea; N-omega-chlorovaleroyl, N'-ethyl urea; N-omega-chlorovaleroyl, N'-acetyl urea, and the like.

The active materials of the invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. Any conventional wetting agent, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions, for example, in water, solvents such as oils, emulsifiers, emulsion stabilizers, and the like can be added. Materials which suppress the phytotoxic action of the fungicides thereby making it possible to utilize unusually high dosages of the fungicidal material, can also be present. For example, glucose is known to protect tomato plants against damage by certain substances having a phytotoxic effect when in concentrated form, such as urea.

The active agents of the present invention can be effectively applied to the plant in various ways, as by (a) contacting parts of the plants above or in the soil therewith, (b) contacting the seed therewith, (c) introducing the agents into the soil near the roots of the plants, or (d) direct introduction of the agents into the plants, for example, through boring holes or incisions in parts of the plants.

It is important in any case that the active agent should be enabled to penetrate into the plant itself. Application to parts of the plants above the soil by means of spraying has proved to be a particularly satisfactory method. When introducing the agents into the soil care should be taken that the agents are introduced as near to the roots as possible and that sufficiently high concentrations be absorbed by the components of the soil as the agents might undergo a chemical or microbiological conversion before penetrating into the plants.

Spraying of the plants to be treated is preferably performed with aqueous solutions or suspensions of the active agents. Aqueous solutions or suspensions containing from about 0.01 to about 1% by weight and preferably from about 0.1 to about 0.5% by weight of the active agent are particularly suitable. Higher concentrations of the fungicidal agents can be employed if no phytotoxic effects are observed. As a rule, however, because of the danger of phytotoxicity, the use of low concentrations is recommended. If desired, a minor amount, of the order of from about 0.01 to about 0.05% by weight, of a wetting agent can be added to aid in forming a suspension of the active agent in the aqueous medium. Any of the conventional wetting agents, such as those mentioned above, can be employed. A particularly suitable wetting agent is the sodium salt of a mixture of secondary heptadecyl sulfates, sold commercially under the name of "Teepol."

The proof that the agents applied to the plants had penetrated into the interior of the plants and exerted their action from there, was furnished by exposing part of the plants treated to artificial rain, so that any trace of the agent still present was washed away. The plants exposed to artificial rain were found to behave just as those treated with the active agent, but not exposed to artificial rain afterwards.

The plant-protecting agents of the present invention are effective against widely divergent parasitic pathogens, some of which, all of great practical importance, are mentioned in the following table:

TABLE I

| Latin Name of the Pathogen | English Name of the Disease | Most Important Plants on Which the Disease May Occur |
| --- | --- | --- |
| Cladosporium fulvum | Leaf mould (tomato disease). | Tomato plants. |
| Septoria apii graveolentis | | Celery plants. |
| Phytophthora infestans | Late blight (potato disease). | Potato plants. |
| Colletotrichum lindemuthianum | Anthracnose | Brown kidney bean plants (Phaseolus vulgaris L.) |
| Exobasidium vexans | Blister blight | Tea plants. |
| Erysiphaceae (various species) | Mildew | Various plants, e. g., apple trees. |
| Uredinales (various species) | Rust | Corn species. |
| Fusarium (various species) | Wilt disease | Cucumber plants. |
| Ceratostomella ulmi | Dutch elm disease | Elm trees. |
| Pseudomonas (various species e. g., Agrobacterium tumefaciens). | Crown gall | Tomato and many other plants. |

All of the pathogens mentioned in the above table are fungi, except the last which is a species of bacteria.

In general, the active agents of the present invention showed no or only an insignificant activity in the well-known spore germination test.

The invention is illustrated by the following examples:

*Example 1*

A number of various test plants were sprayed with an aqueous solution of the active agent shown in Table II below until the liquid dropped from the leaves. After the spray liquid dried, usually after about two days, the plants were exposed to contamination with the pathogen shown in Table II. In all cases, a part of the test plant was also treated prior to contamination, with artificial rain consisting of tap water containing 0.2% by weight of "Teepol" in order to completely remove the spray liquid from the surface of the leaves of the plants.

Depending on the kind of test plant and of the fungus, contamination was effected either by inoculation of the plant or by placing the plant in contaminated surroundings, for example, in a greenhouse in which plants affected by the pathogen were present. Conditions were chosen such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the pathogen has succeeded. Hereinafter, this quantity, expressed in percent, will be termed the degree of suppression. The degree of supression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient, since, in general, results obtained in biological tests are only reproducible within rather wide limits. The results of the tests are summarized in Table II.

Example II

A number of apple tree seedlings 20 cm. high) in pots were sprayed with an aqueous solution of 0.1% by weight of trichloroacetyl urea with an addition of 0.1% by weight of "Teepol" as wetting agent; 80 cu. cm. were applied per square meter. Three days later the plants were placed in a greenhouse and inoculated with spores of apple mildew. After three weeks the affection of leaves (which had in the meantime unfolded at the top) was determined. A degree of suppression of 80% was attained.

Example III

Out of six three-year old elm trees (about 2 m. high, variety hollandica) which were planted in concrete troughs containing one cu. m. of earth, two trees were bored in the trunk to the core. A rubber tubule was introduced into the small hole formed (diameter 3 mm.), which tubule was connected with a small storage vessel containing a 0.02% wt. of aqueous solution of chloroacetyl urea by means of a rubber tube. In the course of two days the solution was entirely absorbed by the plant.

Two days after the end of the absorption period the trees were inoculated at the trunk with a suspension of spores of some races of Ceratostomella ulmi.

With two other trees 2 liters of a 0.1% wt. aqueous solution of chloroacetyl urea were injected among the roots at a depth of 50 cm., while 23 liters of the same solution were poured out upon the soil. Four days later the trees treated in this way, as well as the trees left untreated, were also inoculated.

Three, and in particular six weeks, after the inoculation the untreated trees showed clear symptoms of Dutch elm disease, whereas all the treated trees were unaffected by the disease.

Example IV

Two-month old tomato plants affected by *Agrobacterium tumefaciens* were smeared with a 0.3% wt. aqueous solution of chloroacetyl urea in places where tumors were observed. After 3 weeks the tumors had completely disappeared.

I claim as my invention:

1. A method for protecting plants from destruction by fungi which comprises treating the plants with a fungicidal composition containing a fungicidal amount, within the range 0.1% to 5% by weight of the composition, of a N-haloacyl urea of the formula

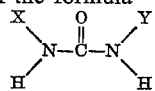

wherein X is a haloalkanoyl radical containing no more than 5 carbon atoms, Y is a member of the group consisting of hydrogen, alkanoyl and haloalkanoyl radicals containing no more than 5 carbon atoms, alkyl radicals containing up to 4 carbon atoms and a phenyl radical.

2. A method of protecting plants from destruction by fungi which comprises treating the plants with a fungicidal composition containing a fungicidal amount, within the range 0.1% to 5% by weight of the composition, of N-chloroacetyl urea.

3. A method of protecting plants from destruction by fungi which comprises treating the plants with a fungicidal composition containing a fungicidal amount, within the range 0.1% to 5% by weight of the composition, of N-trichloroacetyl urea.

4. A method of protecting plants from destruction by fungi which comprises treating the plants with a fungicidal composition containing a fungicidal amount, within the range of 0.1% to 5% by weight of the composition, of NN'-di(chloroacetyl) urea.

5. A method of protecting plants from destruction by fungi which comprises treating the plants with a fungicidal composition containing a fungicidal amount, within the range 0.1% to 5% by weight of the composition, of N-trichloroacetyl, N'-acetyl urea.

6. A method of protecting plants from destruction by fungi which comprises treating the plants with a fungicidal composition containing a fungicidal amount, within the range 0.1% to 5% by weight of the composition, of N-omega-chlorovaleroyl urea.

References Cited in the file of this patent

UNITED STATES PATENTS 983,425     Callsen _____ Feb. 7, 1911

FOREIGN PATENTS 326,567     Great Britain _____ Mar. 20, 1930

TABLE II

| Species of the Plants Treated | Age or Stage of Development of the Plants | Pathogen | Active Substance | Concentration of the Solution | Result Observed After— | Degree of Suppression |
|---|---|---|---|---|---|---|
| Tomatoes | 2 Months | Cladosporium fulvum | N-chloroacetylurea | 0.1 / 0.2 / 0.3 | 7 Days | 28 / 60 / 95 |
| Potatoes | 1 Month | Phytophthora infestans | ___do___ | 0.3 | 1 Week | 50 |
| Celery | Height 20 cm | Septoria apii graveolentis | ___do___ | 0.3 | 3 Weeks | 83 |
| Brown kidney beans (*Phaseolus vulgaris*) | 14 Days | Colletotrichum lindemuthianum | N-trichloroacetyl urea | 0.5 | 14 Days | 100 |
| Tomatoes | 2 Months | Cladosporium fulvum | N-chloroacetyl, N'-phenyl urea | 0.05 | 7 Days | 85 |
| Do | ___do___ | ___do___ | NN'-Di-(chloroacetyl) urea | 0.05 | ___do___ | 70 |
| Do | ___do___ | ___do___ | N-trichloroacetyl - N'-acetyl urea | 0.1 | ___do___ | 90 |
| Do | ___do___ | ___do___ | N-chloroacetyl-N'-isopropyl urea | 0.05 | ___do___ | 70 |
| Do | ___do___ | ___do___ | N-ω chlorovaleroyl urea | 0.05 | ___do___ | 75 |

The contamination was, in all cases, effected by placing the test plants in a contaminated greenhouse.